US008175889B1

(12) United States Patent
Girulat, Jr. et al.

(10) Patent No.: US 8,175,889 B1
(45) Date of Patent: May 8, 2012

(54) SYSTEMS AND METHODS FOR TRACKING CHANGES OF ADDRESS BASED ON SERVICE DISCONNECT/CONNECT DATA

(75) Inventors: Rollin M. Girulat, Jr., Lake Forest, CA (US); Arlene Grace Dang, Yorba Linda, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 1379 days.

(21) Appl. No.: 11/398,504

(22) Filed: Apr. 5, 2006

Related U.S. Application Data

(60) Provisional application No. 60/668,649, filed on Apr. 6, 2005.

(51) Int. Cl.
G06Q 10/00 (2006.01)
G06F 17/30 (2006.01)
(52) U.S. Cl. .......................................... 705/1.1; 707/749
(58) Field of Classification Search ................ 705/1, 1.1
See application file for complete search history.

(56) References Cited

U.S. PATENT DOCUMENTS

| 4,827,508 | A | 5/1989 | Shear |
| 4,868,570 | A | 9/1989 | Davis |
| 4,935,870 | A | 6/1990 | Burk, Jr. et al. |
| 5,121,484 | A | 6/1992 | Hirami et al. |
| 5,146,403 | A | 9/1992 | Goodman |
| 5,247,575 | A | 9/1993 | Sprague et al. |
| 5,325,509 | A | 6/1994 | Lautzenheiser |
| 5,341,429 | A | 8/1994 | Stringer et al. |
| 5,422,821 | A | 6/1995 | Allen et al. |
| 5,528,701 | A | 6/1996 | Aref |
| 5,555,409 | A | 9/1996 | Leenstra, Sr. et al. |
| 5,590,038 | A | 12/1996 | Pitroda |
| 5,640,551 | A | 6/1997 | Chu et al. |
| 5,640,577 | A | 6/1997 | Scharmer |
| 5,655,129 | A | 8/1997 | Ito |
| 5,659,731 | A * | 8/1997 | Gustafson .............................. 1/1 |

(Continued)

FOREIGN PATENT DOCUMENTS
EP      0351871      1/1990
(Continued)

OTHER PUBLICATIONS

Darren J. Waggoner, "Global Identity Crisis", Collections Credit Risk, Aug. 2001, vol. 6, No. 8.

(Continued)

*Primary Examiner* — Jami A Plucinski
*Assistant Examiner* — Sangeeta Bahl
(74) *Attorney, Agent, or Firm* — Knobbe, Martens, Olson & Bear, LLP

(57) ABSTRACT

A computer-implemented system for updating mailing address or other contact information using service disconnect and connect information, such as for telephone, utility, or other service, is described. Electronic information about service disconnect requests and service connection requests is received and compared to identify requests that are linked to the same individual, household, or other entity. A confidence assessment module may produce an indicator, such as a score, of a confidence level in a correct matching of a disconnect and a connect request, based at least in part on similarity of names or other account information, proximity of addresses, and proximity of effective dates associated with potentially matching service connect and disconnect requests. In some embodiments, service disconnect and connect records from a plurality of services are used.

18 Claims, 6 Drawing Sheets

U.S. PATENT DOCUMENTS

| | | | |
|---|---|---|---|
| 5,666,528 A | 9/1997 | Thai | |
| 5,692,107 A | 11/1997 | Simoudis et al. | |
| 5,703,783 A | 12/1997 | Allen et al. | |
| 5,734,568 A | 3/1998 | Borgendale et al. | |
| 5,737,732 A | 4/1998 | Gibson et al. | |
| 5,754,939 A | 5/1998 | Herz et al. | |
| 5,768,423 A | 6/1998 | Aref et al. | |
| 5,774,692 A | 6/1998 | Boyer et al. | |
| 5,778,405 A | 7/1998 | Ogawa | |
| 5,781,634 A | 7/1998 | Cordery et al. | |
| 5,797,136 A | 8/1998 | Boyer et al. | |
| 5,805,710 A | 9/1998 | Higgins et al. | |
| 5,812,840 A | 9/1998 | Shwartz | |
| 5,822,750 A | 10/1998 | Jou et al. | |
| 5,822,751 A | 10/1998 | Gray et al. | |
| 5,828,837 A | 10/1998 | Eikeland | |
| 5,835,915 A | 11/1998 | Carr et al. | |
| 5,844,218 A | 12/1998 | Kawan et al. | |
| 5,881,131 A * | 3/1999 | Farris et al. | 379/15.03 |
| 5,905,985 A | 5/1999 | Malloy et al. | |
| 5,944,787 A | 8/1999 | Zoken | |
| 5,956,693 A | 9/1999 | Geerlings | |
| 5,961,593 A | 10/1999 | Gabber et al. | |
| 5,963,932 A | 10/1999 | Jakobsson et al. | |
| 5,990,038 A | 11/1999 | Suga et al. | |
| 6,038,551 A | 3/2000 | Barlow et al. | |
| 6,070,147 A | 5/2000 | Harms et al. | |
| 6,073,106 A | 6/2000 | Rozen et al. | |
| 6,073,140 A * | 6/2000 | Morgan et al. | 1/1 |
| 6,121,901 A | 9/2000 | Welch et al. | |
| 6,128,624 A | 10/2000 | Papierniak et al. | |
| 6,144,957 A | 11/2000 | Cohen et al. | |
| 6,144,988 A | 11/2000 | Kappel | |
| 6,151,601 A | 11/2000 | Papierniak et al. | |
| 6,157,927 A | 12/2000 | Schaefer et al. | |
| 6,223,171 B1 | 4/2001 | Chaudhuri et al. | |
| 6,246,794 B1 | 6/2001 | Kagehiro et al. | |
| 6,253,202 B1 | 6/2001 | Gilmour | |
| 6,254,000 B1 | 7/2001 | Degen et al. | |
| 6,256,630 B1 | 7/2001 | Gilai et al. | |
| 6,263,334 B1 | 7/2001 | Fayyad et al. | |
| 6,263,337 B1 | 7/2001 | Fayyad et al. | |
| 6,304,869 B1 | 10/2001 | Moore et al. | |
| 6,311,169 B2 | 10/2001 | Duhon | |
| 6,339,769 B1 | 1/2002 | Cochrane et al. | |
| 6,366,903 B1 | 4/2002 | Agrawal et al. | |
| 6,393,406 B1 | 5/2002 | Eder | |
| 6,405,173 B1 | 6/2002 | Honarvar et al. | |
| 6,446,200 B1 | 9/2002 | Ball et al. | |
| 6,457,012 B1 * | 9/2002 | Jatkowski | 707/756 |
| 6,463,533 B1 | 10/2002 | Calamera et al. | |
| 6,496,819 B1 | 12/2002 | Bello et al. | |
| 6,505,168 B1 | 1/2003 | Rothman et al. | |
| 6,523,022 B1 | 2/2003 | Hobbs | |
| 6,523,041 B1 | 2/2003 | Morgan et al. | |
| 6,574,623 B1 | 6/2003 | Leung et al. | |
| 6,575,376 B2 | 6/2003 | Yu | |
| 6,581,059 B1 | 6/2003 | Barrett et al. | |
| 6,601,173 B1 | 7/2003 | Mohler | |
| 6,651,220 B1 | 11/2003 | Penteroudakis et al. | |
| 6,734,886 B1 | 5/2004 | Hagan et al. | |
| 6,741,724 B1 | 5/2004 | Bruce et al. | |
| 6,748,426 B1 | 6/2004 | Shaffer et al. | |
| 6,754,665 B1 | 6/2004 | Futagami et al. | |
| 6,766,327 B2 | 7/2004 | Morgan, Jr. et al. | |
| 6,766,946 B2 | 7/2004 | Iida et al. | |
| 6,804,346 B1 | 10/2004 | Mewhinney | |
| 6,804,701 B2 | 10/2004 | Muret et al. | |
| 6,845,448 B1 | 1/2005 | Chaganti et al. | |
| 6,850,895 B2 | 2/2005 | Brodersen et al. | |
| 6,871,287 B1 | 3/2005 | Ellingson | |
| 6,879,983 B2 | 4/2005 | Bellamy et al. | |
| 6,910,624 B1 | 6/2005 | Natsuno | |
| 6,934,714 B2 | 8/2005 | Meinig | |
| 6,950,858 B2 | 9/2005 | Ogami | |
| 6,983,379 B1 | 1/2006 | Spalink et al. | |
| 6,983,478 B1 | 1/2006 | Grauch et al. | |
| 6,985,887 B1 | 1/2006 | Sunstein et al. | |
| 6,988,129 B2 | 1/2006 | Quine | |
| 7,003,504 B1 | 2/2006 | Angus et al. | |
| 7,028,001 B1 | 4/2006 | Muthuswamy et al. | |
| 7,028,013 B2 | 4/2006 | Saeki | |
| 7,028,052 B2 | 4/2006 | Chapman et al. | |
| 7,035,855 B1 | 4/2006 | Kilger et al. | |
| 7,043,476 B2 | 5/2006 | Robson | |
| 7,076,475 B2 | 7/2006 | Honarvar | |
| 7,082,435 B1 | 7/2006 | Guzman et al. | |
| 7,184,974 B2 | 2/2007 | Shishido | |
| 7,185,016 B1 | 2/2007 | Rasmussen | |
| 7,194,416 B1 | 3/2007 | Provost et al. | |
| 7,200,602 B2 * | 4/2007 | Jonas | 1/1 |
| 7,209,895 B2 | 4/2007 | Kundtz et al. | |
| 7,234,156 B2 | 6/2007 | French et al. | |
| 7,234,160 B2 | 6/2007 | Vogel et al. | |
| 7,240,059 B2 | 7/2007 | Bagliss et al. | |
| 7,246,067 B2 | 7/2007 | Austin et al. | |
| 7,246,740 B2 | 7/2007 | Swift et al. | |
| 7,272,591 B1 | 9/2007 | Ghazal et al. | |
| 7,277,900 B1 | 10/2007 | Ganesh et al. | |
| 7,314,167 B1 | 1/2008 | Kiliccote | |
| 7,343,149 B2 | 3/2008 | Benco | |
| 7,356,516 B2 | 4/2008 | Richey et al. | |
| 7,366,726 B2 | 4/2008 | Bellamy et al. | |
| 7,370,044 B2 * | 5/2008 | Mulhern et al. | 707/758 |
| 7,383,215 B1 | 6/2008 | Navarro et al. | |
| 7,389,913 B2 | 6/2008 | Starrs | |
| 7,403,942 B1 | 7/2008 | Bayliss | |
| 7,433,864 B2 | 10/2008 | Malik | |
| 7,451,113 B1 | 11/2008 | Kasower | |
| 7,458,508 B1 | 12/2008 | Shao | |
| 7,460,857 B2 | 12/2008 | Roach, Jr. | |
| 7,467,127 B1 | 12/2008 | Baccash | |
| 7,475,118 B2 | 1/2009 | Leiba et al. | |
| 7,478,157 B2 | 1/2009 | Bohrer et al. | |
| 7,483,842 B1 | 1/2009 | Fung et al. | |
| 7,503,489 B2 | 3/2009 | Heffez | |
| 7,509,117 B2 | 3/2009 | Yum | |
| 7,512,221 B2 | 3/2009 | Toms | |
| 7,529,698 B2 | 5/2009 | Joao | |
| 7,542,993 B2 | 6/2009 | Satterfield | |
| 7,548,886 B2 | 6/2009 | Kirkland et al. | |
| 7,562,814 B1 | 7/2009 | Shao et al. | |
| 7,575,157 B2 | 8/2009 | Barnhardt et al. | |
| 7,581,112 B2 | 8/2009 | Brown et al. | |
| 7,587,366 B2 | 9/2009 | Grim, III et al. | |
| 7,603,701 B2 | 10/2009 | Gaucas | |
| 7,606,725 B2 | 10/2009 | Robertson et al. | |
| 7,610,216 B1 | 10/2009 | May et al. | |
| 7,620,596 B2 | 11/2009 | Knudson et al. | |
| 7,623,844 B2 | 11/2009 | Herrmann et al. | |
| 7,653,600 B2 | 1/2010 | Gustin | |
| 7,668,725 B2 | 2/2010 | Alston | |
| 7,668,840 B2 | 2/2010 | Bayliss et al. | |
| 7,672,833 B2 | 3/2010 | Blume et al. | |
| 7,672,924 B1 | 3/2010 | Scheurich et al. | |
| 7,672,926 B2 | 3/2010 | Ghazal et al. | |
| 7,686,214 B1 | 3/2010 | Shao et al. | |
| 7,689,487 B1 | 3/2010 | Britto et al. | |
| 7,689,505 B2 | 3/2010 | Kasower | |
| 7,690,032 B1 | 3/2010 | Peirce | |
| 7,698,445 B2 | 4/2010 | Fitzpatrick et al. | |
| 7,708,190 B2 | 5/2010 | Brandt et al. | |
| 7,711,635 B2 | 5/2010 | Steele et al. | |
| 7,743,043 B2 | 6/2010 | Winslow | |
| 7,761,384 B2 | 7/2010 | Madhogarhia | |
| 7,769,696 B2 | 8/2010 | Yoda | |
| 7,769,697 B2 | 8/2010 | Fieschi et al. | |
| 7,792,683 B2 | 9/2010 | Sipe et al. | |
| 7,793,835 B1 | 9/2010 | Coggeshall | |
| 7,802,104 B2 | 9/2010 | Dickinson | |
| 7,827,115 B2 | 11/2010 | Weller et al. | |
| 7,841,004 B1 | 11/2010 | Balducci | |
| 7,841,008 B1 | 11/2010 | Cole et al. | |
| 7,849,014 B2 | 12/2010 | Erikson | |
| 7,853,493 B2 | 12/2010 | DeBie et al. | |
| 2001/0011245 A1 | 8/2001 | Duhon | |
| 2001/0037332 A1 | 11/2001 | Miller et al. | |

| Publication No. | Date | Name |
|---|---|---|
| 2001/0049620 A1 | 12/2001 | Blasko |
| 2002/0013899 A1 | 1/2002 | Faul |
| 2002/0026507 A1 | 2/2002 | Sears et al. |
| 2002/0059142 A1 | 5/2002 | Krause et al. |
| 2002/0069122 A1 | 6/2002 | Yun et al. |
| 2002/0077964 A1 | 6/2002 | Brody et al. |
| 2002/0087460 A1 | 7/2002 | Hornung |
| 2002/0103809 A1 | 8/2002 | Starzl et al. |
| 2002/0128962 A1 | 9/2002 | Kasower |
| 2002/0133462 A1 | 9/2002 | Shteyn |
| 2002/0133504 A1 | 9/2002 | Vlahos et al. |
| 2002/0138297 A1 | 9/2002 | Lee |
| 2002/0169747 A1 | 11/2002 | Chapman et al. |
| 2002/0173984 A1 | 11/2002 | Robertson et al. |
| 2002/0173994 A1 | 11/2002 | Ferguson, III |
| 2002/0184255 A1 | 12/2002 | Edd et al. |
| 2002/0198824 A1 | 12/2002 | Cook |
| 2003/0009418 A1 | 1/2003 | Green et al. |
| 2003/0009426 A1 | 1/2003 | Ruiz-Sanchez |
| 2003/0018549 A1 | 1/2003 | Fei et al. |
| 2003/0061163 A1 | 3/2003 | Durfield |
| 2003/0083893 A1 | 5/2003 | Aliffi et al. |
| 2003/0097380 A1 | 5/2003 | Mulhern et al. |
| 2003/0101344 A1 | 5/2003 | Wheeler et al. |
| 2003/0115133 A1 | 6/2003 | Bian |
| 2003/0171942 A1 | 9/2003 | Gaito |
| 2003/0182018 A1 | 9/2003 | Snapp |
| 2003/0195859 A1 | 10/2003 | Lawrence |
| 2003/0212600 A1 | 11/2003 | Hood, III et al. |
| 2003/0220858 A1 | 11/2003 | Lam et al. |
| 2004/0015714 A1 | 1/2004 | Abraham et al. |
| 2004/0015715 A1 | 1/2004 | Brown |
| 2004/0019518 A1 | 1/2004 | Abraham et al. |
| 2004/0044628 A1 | 3/2004 | Mathew et al. |
| 2004/0107132 A1 | 6/2004 | Honarvar et al. |
| 2004/0111359 A1 | 6/2004 | Hudock |
| 2004/0117358 A1 | 6/2004 | von Kaenel et al. |
| 2004/0139025 A1 | 7/2004 | Coleman |
| 2004/0153448 A1 | 8/2004 | Cheng et al. |
| 2004/0167793 A1 | 8/2004 | Masuoka et al. |
| 2004/0193891 A1 | 9/2004 | Ollila |
| 2004/0199456 A1 | 10/2004 | Flint et al. |
| 2004/0220896 A1 | 11/2004 | Finlay et al. |
| 2004/0225596 A1 | 11/2004 | Kemper et al. |
| 2004/0230527 A1 | 11/2004 | Hansen et al. |
| 2004/0243539 A1* | 12/2004 | Skurtovich et al. ............... 707/1 |
| 2004/0243588 A1 | 12/2004 | Tanner et al. |
| 2005/0005168 A1 | 1/2005 | Dick |
| 2005/0021476 A1 | 1/2005 | Candella et al. |
| 2005/0021856 A1 | 1/2005 | Basile et al. |
| 2005/0027983 A1 | 2/2005 | Klawon |
| 2005/0027995 A1 | 2/2005 | Menschik et al. |
| 2005/0058262 A1 | 3/2005 | Timmins et al. |
| 2005/0060332 A1 | 3/2005 | Bernstein et al. |
| 2005/0108631 A1 | 5/2005 | Amorin et al. |
| 2005/0154665 A1 | 7/2005 | Kerr |
| 2005/0267821 A1 | 12/2005 | Anderson |
| 2006/0036543 A1 | 2/2006 | Blagg et al. |
| 2006/0041464 A1 | 2/2006 | Powers et al. |
| 2006/0059110 A1 | 3/2006 | Madhok et al. |
| 2006/0074986 A1 | 4/2006 | Mallalieu et al. |
| 2006/0080263 A1 | 4/2006 | Willis et al. |
| 2006/0129481 A1 | 6/2006 | Bhatt et al. |
| 2006/0131390 A1 | 6/2006 | Kim |
| 2006/0161435 A1 | 7/2006 | Atef et al. |
| 2006/0173776 A1 | 8/2006 | Shalley et al. |
| 2006/0178971 A1 | 8/2006 | Owen et al. |
| 2006/0179050 A1 | 8/2006 | Giang et al. |
| 2006/0218407 A1 | 9/2006 | Toms |
| 2006/0229943 A1 | 10/2006 | Mathias et al. |
| 2006/0229961 A1 | 10/2006 | Lyftogt et al. |
| 2006/0239512 A1 | 10/2006 | Petrillo |
| 2006/0253358 A1 | 11/2006 | Delgrosso et al. |
| 2006/0262929 A1 | 11/2006 | Vatanen et al. |
| 2006/0271456 A1 | 11/2006 | Romain et al. |
| 2006/0271457 A1 | 11/2006 | Romain et al. |
| 2006/0282359 A1 | 12/2006 | Nobili et al. |
| 2006/0282429 A1 | 12/2006 | Hernandez-Sherrington et al. |
| 2006/0294199 A1 | 12/2006 | Bertholf |
| 2007/0005508 A1 | 1/2007 | Chiang |
| 2007/0027816 A1 | 2/2007 | Writer |
| 2007/0033227 A1 | 2/2007 | Gaito et al. |
| 2007/0038483 A1 | 2/2007 | Wood |
| 2007/0072190 A1 | 3/2007 | Aggarwal |
| 2007/0073889 A1 | 3/2007 | Morris |
| 2007/0078985 A1 | 4/2007 | Shao et al. |
| 2007/0083460 A1 | 4/2007 | Bachenheimer |
| 2007/0093234 A1 | 4/2007 | Willis et al. |
| 2007/0112667 A1 | 5/2007 | Rucker |
| 2007/0124256 A1 | 5/2007 | Crooks et al. |
| 2007/0156554 A1 | 7/2007 | Nikoley et al. |
| 2007/0174186 A1 | 7/2007 | Hokland |
| 2007/0174448 A1 | 7/2007 | Ahuja et al. |
| 2007/0205266 A1 | 9/2007 | Carr et al. |
| 2007/0226093 A1 | 9/2007 | Chan et al. |
| 2007/0244807 A1 | 10/2007 | Andringa et al. |
| 2007/0288355 A1 | 12/2007 | Roland et al. |
| 2008/0010206 A1 | 1/2008 | Coleman |
| 2008/0010687 A1 | 1/2008 | Gonen et al. |
| 2008/0066188 A1 | 3/2008 | Kwak |
| 2008/0071682 A1 | 3/2008 | Dominguez |
| 2008/0077526 A1 | 3/2008 | Arumugam |
| 2008/0086759 A1 | 4/2008 | Colson |
| 2008/0103800 A1 | 5/2008 | Domenikos et al. |
| 2008/0103972 A1 | 5/2008 | Lanc |
| 2008/0109444 A1 | 5/2008 | Williams et al. |
| 2008/0109875 A1 | 5/2008 | Kraft |
| 2008/0115191 A1 | 5/2008 | Kim et al. |
| 2008/0126233 A1 | 5/2008 | Hogan |
| 2008/0175360 A1 | 7/2008 | Schwarz et al. |
| 2008/0183480 A1 | 7/2008 | Carlson et al. |
| 2008/0205655 A1 | 8/2008 | Wilkins et al. |
| 2008/0208873 A1 | 8/2008 | Boehmer |
| 2008/0255992 A1 | 10/2008 | Lin |
| 2008/0270209 A1 | 10/2008 | Mauseth et al. |
| 2008/0281737 A1 | 11/2008 | Fajardo |
| 2008/0288299 A1 | 11/2008 | Schultz |
| 2008/0306750 A1 | 12/2008 | Wunder et al. |
| 2009/0006230 A1 | 1/2009 | Lyda et al. |
| 2009/0031426 A1 | 1/2009 | Dal Lago et al. |
| 2009/0037332 A1 | 2/2009 | Cheung et al. |
| 2009/0043691 A1 | 2/2009 | Kasower |
| 2009/0055894 A1 | 2/2009 | Lorsch |
| 2009/0094237 A1 | 4/2009 | Churi et al. |
| 2009/0094674 A1 | 4/2009 | Schwartz et al. |
| 2009/0106141 A1 | 4/2009 | Becker |
| 2009/0106150 A1 | 4/2009 | Pelegero et al. |
| 2009/0125369 A1 | 5/2009 | Kloostra et al. |
| 2009/0138335 A1 | 5/2009 | Lieberman |
| 2009/0150166 A1 | 6/2009 | Leite et al. |
| 2009/0150238 A1 | 6/2009 | Marsh et al. |
| 2009/0177529 A1 | 7/2009 | Hadi |
| 2009/0210241 A1 | 8/2009 | Calloway |
| 2009/0254476 A1 | 10/2009 | Sharma et al. |
| 2009/0260064 A1 | 10/2009 | Mcdowell et al. |
| 2009/0307778 A1 | 12/2009 | Mardikar |
| 2010/0043055 A1 | 2/2010 | Baumgart |
| 2010/0094768 A1 | 4/2010 | Miltonberger |
| 2010/0100945 A1 | 4/2010 | Ozzie et al. |
| 2010/0114744 A1 | 5/2010 | Gonen |
| 2010/0114776 A1 | 5/2010 | Weller et al. |
| 2010/0130172 A1 | 5/2010 | Vendrow et al. |
| 2010/0145840 A1 | 6/2010 | Kasower |
| 2010/0153278 A1 | 6/2010 | Farsedakis |
| 2010/0179906 A1 | 7/2010 | Hawkes |
| 2010/0205662 A1 | 8/2010 | Ibrahim et al. |
| 2010/0229245 A1 | 9/2010 | Singhal |
| 2010/0241535 A1 | 9/2010 | Nightengale et al. |
| 2010/0250364 A1 | 9/2010 | Song et al. |
| 2010/0280914 A1 | 11/2010 | Carlson |
| 2011/0004498 A1 | 1/2011 | Readshaw |
| 2011/0035788 A1 | 2/2011 | White et al. |

FOREIGN PATENT DOCUMENTS

| | | |
|---|---|---|
| EP | 0419889 | 4/1991 |
| EP | 0458698 | 11/1991 |
| EP | 0559358 | 9/1993 |
| EP | 0 584 607 | 3/1994 |

| | | |
|---|---|---|
| EP | 0977128 | 2/2000 |
| EP | 0772836 | 12/2001 |
| WO | WO 95/34155 | 12/1995 |
| WO | WO 96/00945 | 1/1996 |
| WO | WO 98/41931 | 9/1998 |
| WO | WO 98/41932 | 9/1998 |
| WO | WO 98/41933 | 9/1998 |
| WO | WO 99/17225 | 4/1999 |
| WO | WO 99/17226 | 4/1999 |
| WO | WO 99/38094 | 7/1999 |
| WO | WO 00/04465 | 1/2000 |
| WO | WO 00/28441 | 5/2000 |
| WO | WO 01/84281 | 11/2001 |
| WO | WO 2004/114160 | 12/2004 |

OTHER PUBLICATIONS

David Loshin, Intelligent Enterprise, Value-Added Data: Merge Ahead, Feb. 9, 2000, vol. 3, No. 3.

Julie Rawe, "Identity Thieves", Time Bonus Section, Inside Business, Feb. 2002.

LifeLock, "How LifeLock Works," http://www.lifelock.com/lifelock-for-people, accessed on Mar. 14, 2008.

LifeLock, "LifeLock Launches First ID Theft Prevention Program for the Protection of Children," Oct. 14, 2005 Press Release, posted on http://www.lifelock.com/about-us/press-room/2005-press-releases/lifelock-protection-for-children, accessed on Mar. 14, 2008.

LifeLock; "How can LifeLock protect my kids and family?," http//www.lifelock.com/lifelock-for-people/how-we-do-it/how-can-lifelock-protect-my-kids-and-family, accessed on Mar. 14, 2008.

Truston, "Checking if your child is an ID theft victim can be stressful," as posted by Michelle Pastor on Jan. 22, 2007 at http://www.mytruston.com/blog/credit/checking_if_your_child_is_an_id_theft_vi.html.

W.A. Lee, "Experian, on Deal Hunt, Nets Identity Theft Insurer", American Banker: The Financial Services Daily, Jun. 4, 2003.

U.S. Appl. No. 12/705,489, filed Feb. 12, 2010, Bargoli et al.

U.S. Appl. No. 12/705,511, filed Feb. 12, 2010, Bargoli et al.

Elmasri et al., "Fundamentals of Database Systems, Third Edition (Excerpts)," Jun. 2000, pp. 253, 261, 268-270, 278-280, 585, 595.

Ettore, Paul Kahn on Exceptional Marketing. Management Review, vol. 38(11), Nov. 1994, pp. 48-51.

Ideon, Credit-Card Registry that Bellyflopped this Year, Is Drawing some Bottom-Fishers, The Wall Street Journal, Aug. 21, 1995, pp. C2.

Klein, "A Constant-Utility Index of the Cost of Living", The Review of Economic Studies, 1960, pp. 84-87, vol. XV-XVI, Kraus Reprint Corporation, New York.

Klein, L.R. & Goldberger, A.S. (1955) An Econometric Model of the United States: 1929-1952, Amsterdam: North-Holland.

Klein, L.R. (1947) The Keynesian Revolution, New York: MacMillan.

Magid, Lawrence, J., Business Tools: When Selecting an ASP Ensure Data Mobility, Los Angeles Times, Feb. 26, 2001, vol. C, Issue 4, pp. 3 pages, Los Angeles, CA.

Privacy Rights Clearinghouse: Identity Theft—"What to do if it happens to you" (www.privacyrights.org) (1999).

Ramaswamy, Vinita M. "Identify-Theft Toolkit". The CPA Journal. New York: Oct. 2006, vol. 76, Iss. 10; p. 66, (5 pages).

Real IQ, RealIQ.com, retrieved from web.archive.org <http://replay.web.archive.org/20051212152337/http://www.realiq.com/mortgage.html> as printed on Apr. 28, 2011, pp. 2 pgs.

Sax, Michael M., Data Collection and Privacy Protection : An International Perspective, Presentation: Managing Online Risk and Liability Conference, Aug. 31, 1999, pp. 58 pages.

Smith, Wendell R., "Product Differentiation and Market Segmentation as Alternative Marketing Strategies", The Journal of Marketing, Jul. 1956, pp. 3-8, vol. XXI, The American Marketing Association, Brattleboro, Vermont, U.S.A.

Stone, "Linear Expenditure Systems and Demand Analysis: An Application to the Pattern of British Demand", The Economic Journal: The Journal of the Royal Economic Society, 1954, pp. 511-527, vol. LXIV, Macmillan & Co., London.

Supplemental European Search Report in PCT/IB02/05540, Oct. 21, 2004.

Various Posts from 2003 and 2004 at http://web.archive.org/web/2005045221950/http://p2p.wrox.com/topic.asp?TOPIC_ID=6513.

Web Page posted at: http://web.archive.org/web20040805124909/http://www.oracle.com/technology/sample_codete/tech/pl_sql/htdocs/x/Case/start.htm, pp. 1 and 4 of the webs page posted on Jan. 7, 2003.

Working, Holbrook, "Statistical Laws of Family Expenditure", Journal of the American Statistical Association, 1943, pp. 43-56, vol. 38, American Statistical Association, Washington, D.C.

* cited by examiner

FIG. 2

| # | TYPE | SURNAME | 1st NAME | STREET ADDR | CITY | ZIP | TELEPHONE | EFF DATE |
|---|------|---------|----------|-------------|------|-----|-----------|----------|
| 1 | DEL | AARA | S | | MADISON HTS | 48071 | 248-731-9987 | MAY 10, 2005 |
| 2 | ADD | AARA | S | 313 MARKET ST | ROYAL OAKS | 48073 | 248-223-3445 | MAY 10, 2005 |
| 3 | DEL | ABBOTT | CAROL | | BATES | 49920 | 922-654-3210 | JAN 16, 2005 |
| 4 | ADD | ABBEY | BRUCE | 2040 MAIN ST | CARLETON | 48117 | 269-987-6543 | APR 17, 2005 |
| 5 | DEL | BARADA | ANN | 4105 ELM ST | EAST LANSING | 48823 | 517-337-3737 | MAY 13, 2005 |
| 6 | ADD | BARADA | ANNE | 3378 BALSAM CT | GRAND RAPIDS | 49525 | 616-361-1234 | MAY 10, 2005 |
| 7 | ADD | BASSETT | J | 1517 LEE AVE. | DETROIT | 48203 | 313-577-1297 | MAY 15, 2005 |
| 8 | ADD | BRANCH | KIM | 1271 GRANT CT. | CARLETON | 48117 | 269-883-4567 | MAY 1, 2005 |
| 9 | DEL | BURNS | A | 9337 ELSA ST | DETROIT | 48214 | 313-909-8012 | MAY 14, 2005 |
| 10 | ADD | BURNS | ADAM | | COSTA MESA, CA | 92626 | 714-831-2345 | MAY 16, 2005 |
| 11 | DEL | BURNS | S | 6434 HAYDEN ST | FLINT | 49920 | 313-384-2100 | MAY 9, 2005 |
| 12 | ADD | BURNS | SABINA | 1954 GRACE TERR. | GARFIELD | 49686 | 231-977-8216 | MAY 7, 2005 |
| 13 | ADD | BURNS | SARA | 2853 WESTVIEW DR. | DETROIT | 48228 | 313-384-2100 | MAY 15, 2005 |
| ... | | | | | | | | |

| SCORE | Match Description |
|---|---|
| 800 | Same: Last Name, First Name, Telephone No. |
| 700 | Same: Last Name, Telephone No. Close: First Name |
| 600 | Same: Last Name, Telephone No. Initial match only for First Name |
| 500 | Same: Last Name, Telephone No. |
| 400 | Same: Last Name, First Name (full) |
| 300 | Same: Last Name Close: First Name |
| 200 | Same: Last Name, Initial match only for First Name |
| 100 | Only Last Names Match |
| +80 | IN-STATE, 0-60 miles, 0-30 days |
| +70 | IN-STATE, 61+ miles, 0-30 days |
| +60 | OUT-OF-STATE, 0-60 miles, 0-30 days |
| +50 | OUT-OF-STATE, 61+ miles, 0-30 days |
| +40 | IN-STATE, 0-60 miles, 31+ days |
| +30 | IN-STATE, 61+ miles, 31+ days |
| +20 | OUT-OF-STATE, 0-60 miles, 31+ days |
| +10 | OUT-OF-STATE, 61+ miles, 31+ days |
| +200 | Multiple Matching Service Diconnects/Connects |

*FIG. 4*

SYSTEMS AND METHODS FOR TRACKING CHANGES OF ADDRESS BASED ON SERVICE DISCONNECT/CONNECT DATA

PRIORITY CLAIM

This application claims the benefit of priority under 35 U.S.C. §119(e) of U.S. Provisional Application No. 60/668,649, filed on Apr. 6, 2005 and titled PHONE-BASED CHANGE OF ADDRESS SYSTEM, the entirety of which is incorporated herein by reference.

FIELD OF THE INVENTION

The invention relates to the field of computerized information management, and, in particular to a system for quickly updating address information in a database of information about a population.

BACKGROUND OF THE INVENTION

Many entities desire to maintain very up-to-date address information for members of a population of interest. For example, creditors want their records to be updated as quickly as possible when a change of address occurs for one of their debtors. Similarly, mailers of catalogs, magazines, newsletters, and other items sent by mail typically want to keep their mailing lists up-to-date to ensure that their mailed items reach the intended recipients, without unnecessary waste of time or money.

Furthermore, these and other entities, including entities who market their, products and/or services to people who have recently moved, may also wish to link newly moved customers to their previous account information, where applicable.

Many such entities rely on change of address notifications submitted to them, via telephone, mail, email, or online, by individuals who are moving. However, some individuals may not be motivated to update their change of address information in a timely fashion, or at all.

Change of address notifications received directly from the individuals who are moving may be supplemented with change of address information purchased from the United States Postal Service (USPS). However, information from the USPS includes only instances in which a mail customer has requested forwarding of mail service from an old address to a new address. Information received from the USPS thus suffers from the same reliance on a mover's motivation to explicitly report a change of address. Furthermore, change of address updates from the USPS may become available only a week or more after the fact, which may be longer than some entities prefer to wait for notification.

SUMMARY

A computer-implemented system for quickly updating mailing address records or other contact information using service disconnect and connect information, such as for telephone or other utility or other service, is described. The system is able to identify new addresses or other contact information and to link the new information with previous address or other contact or account information. The service disconnect/connect information may be received from a service provider or from another provider of service-related information, such as an electronic telephone directory assistance information provider. In one embodiment, a first set of electronic information is received with data about recent service disconnect requests. A second set of electronic information is received with data about recent service connection requests. The sets of information may, for example, include records with storage space for a name, address, telephone number, and date and/or other information associated with individual requests. A service-based change of address system compares potentially matching disconnect and connect requests from the two sets. In various embodiments, a confidence assessment module produces an indicator, such as a score, of a confidence level in a correct matching of a disconnect request and a connect request. In some embodiments, if a desired level of confidence is assessed for a given pair of requests, an address record in the database associated with the pair may be updated. In some embodiments, service disconnect and connect records from a plurality of services may be used.

An embodiment of a method of updating a computerized record of an entity's address is described. The method includes the acts of: receiving computerized information regarding telephone service disconnect requests; receiving computerized information regarding telephone service connect requests; programmatically comparing the telephone service disconnect information and the telephone service connect information to identify information reflective of a change of address for at least one entity; and programmatically updating a record of the at least one entity's address to reflect the change of address identified from the disconnect information and the connect information.

An embodiment of a computer-based system for using information about telephone service connect and disconnect orders to identify changes in contact information about a population of interest is described. The system includes electronically readable data comprising records associated with service connect and disconnect orders, and a computer system configured to read the electronically readable data and to identify at least a portion of the information associated with a service disconnect order and at least a portion of the information associated with a service connect order, wherein the at least one disconnect order and the at least one connect order are reflective of a change of contact information for an entity.

An embodiment of a system for updating a computerized record of an entity's address is described. The system comprises: means for receiving computerized information regarding service disconnect requests; means for receiving computerized information regarding service connect requests; means for programmatically comparing the service disconnect information and the service connect information to identify information reflective of a change of address for an entity; and means for programmatically updating a record of the entity's address to reflect the change of address identified from the service disconnect information and the service connect information.

An embodiment of a method of identifying changes to contact information for a plurality of entities is described. The method comprises: receiving computerized information regarding service disconnect requests; receiving computerized information regarding service connect requests; programmatically comparing the service disconnect information and the service connect information to identify information reflective of changes in contact information for a plurality of entities; and storing data about the identified information.

Neither this summary nor the following detailed description defines the invention. The invention is defined by the claims.

BRIEF DESCRIPTION OF THE DRAWINGS

A general architecture that implements various features of specific embodiments of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

FIG. 2 provides an example portion of one embodiment of a merged telephone service disconnect/connect file.

FIG. 4 is a table outlining one embodiment of a scoring system for assessing confidence in a correct match between sets of service connect records and a service disconnect records.

DETAILED DESCRIPTION OF THE PREFERRED EMBODIMENT

Figure 1:
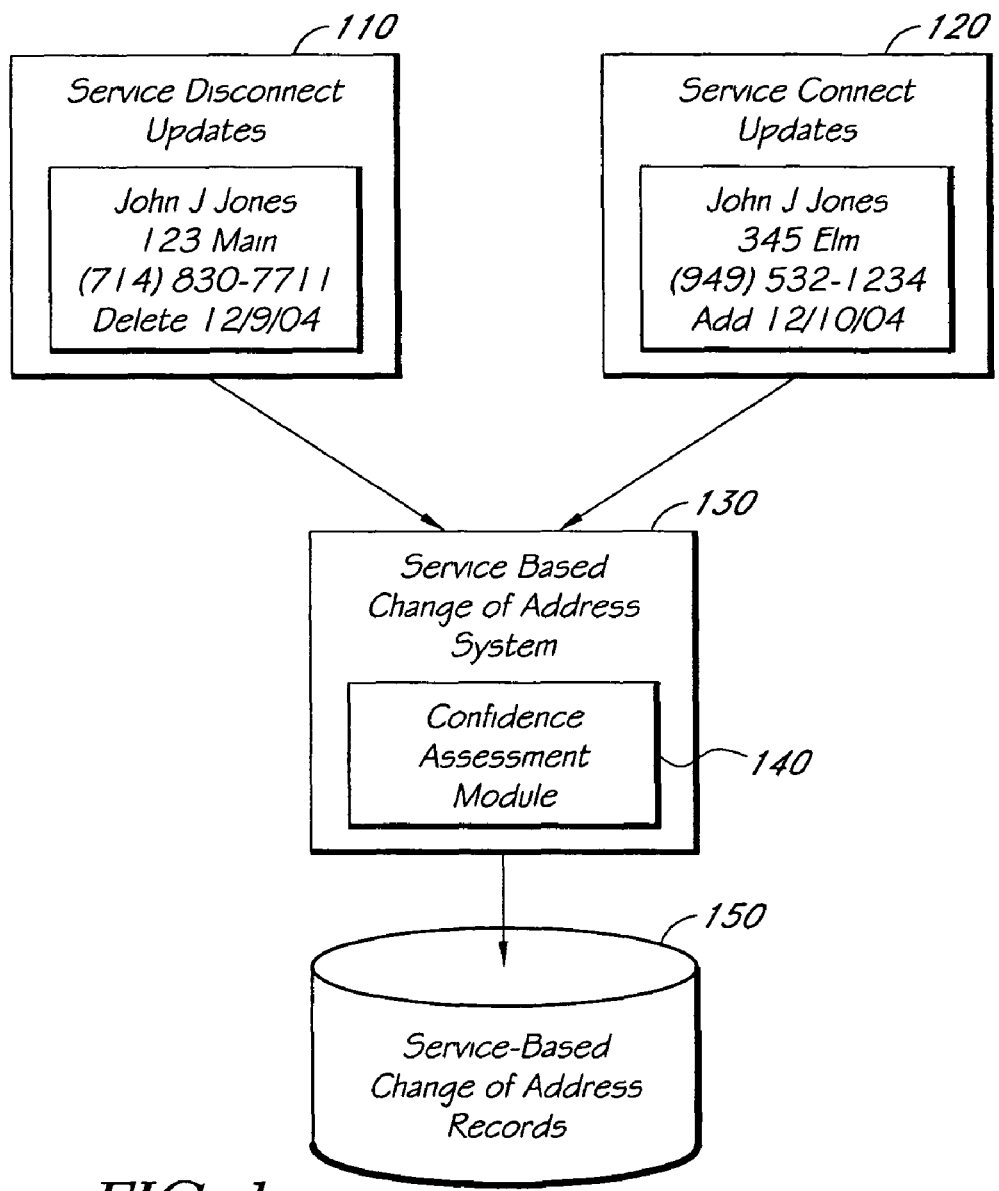
FIG. 1 is a block diagram that provides an overview of one embodiment of the service-based change of address system.

Individuals, households, businesses, organizations, and other entities that are associated with a given residential address or place of business typically have one or more service accounts associated with the address of the residence or place of business. For example, most residential addresses are associated with telephone service, electricity service, water service, and gas service. In addition to these utility services, other types of services, such as cable service, Internet service, satellite service or direct television service, cellular telephone service, library card privileges, regular delivery services, such as newspaper or water delivery, regular maintenance services, such as pool or gardening services, garbage pick-up service, and the like, may be associated with occupants of a given residential or business address.

Individuals and others who move from a first address to a second address frequently submit a request to providers of each such service that the service at the first address be discontinued. Furthermore, a request to providers of each such service that is desired at the second address is frequently also submitted to connect such services at the second address.

In some instances, and where permitted by law, the service providers, or third-party information providers, may make information about the disconnect and/or connect requests available to a service-based change of address system that identifies changes of address for the individuals, households, businesses and the like, from the disconnect and connect information, as will be described in greater detail in the remaining disclosure to follow.

Because such disconnect and connect requests are often submitted to the service providers before the date of an actual move from the first address to the second address, or soon thereafter, very recent or even upcoming changes of address can often be identified by the service-based change of address system from the disconnect and connect information.

Entities who are interested in learning very quickly of changes of address or other contact information on the part of individuals, households, businesses, or the like, may wish to obtain the change of address information from the service-based change of address system. For example, creditors and collection agencies often wish to have very up-to-date address and other contact information for individuals and businesses who owe money to the creditors. Marketers and other merchants may also wish to be able to link a new service account for an individual at a new address with information from an account associated with the individual at a previous address.

With reference to the figures, embodiments of computer-implemented systems and methods that quickly identify changes of address for individuals, households, businesses, and the like, based on information about requests to disconnect and/or to connect services, such as utility services, associated with the individuals, households, businesses are now described.

FIG. 1 is a block diagram that provides an overview of one embodiment of the service-based change of address (COA) system 130. The service-based COA system 130, including components, process flows, and functions described herein, may be embodied in, and fully automated by, computer program logic code modules executed by one or more computer processors, such as, but not limited to, general purpose computers. The code modules may be stored in any type of computer storage device or devices, including, but not limited to, hard disk storage, solid state RAM, and the like. In other embodiments, portions of the processes described herein may be implemented in special purpose hardware, such as ASIC or FPGA devices.

Furthermore, the modules may be hosted by one or more processor-based platforms, such as those implemented by Windows-based and/or UNIX-based operating platforms and may utilize one or more conventional programming languages such as DB/C, C, C++, UNIX Shell, and Structured Query Language (SQL) to accomplish methods in accordance with the invention, including system functionality, data processing, and communications between functional modules.

In one embodiment, a service-based COA system 130 receives service update files 110, 120 on a regular basis, for example on a weekly or other periodic basis, from various service providers and/or from third party service information providers. For example, telephone service update files may be received from an electronic directory assistance service or other service information provider. The update files 110, 120 include information about recent customer requests for connection and/or disconnection of new and existing service accounts, and may be received by the service-based COA system 130 in a variety of formats, including, but not limited to, electronic media such as disks or tape that may be physically sent to the service-based COA system 130, electronic information transmitted via a computer network such as the Internet or via dedicated communication lines, or in another suitable format. In some embodiments, as depicted in FIG. 1, the update information may be received as separate disconnect and connect files, including one or more files for disconnect requests and one or more files for connection requests. The disconnect and connect information may also be provided in one or more merged files.

In some embodiments, information about the disconnect and connect requests may be communicated to the service-based COA system 130 as the requests are received or upon demand by the service-based COA system 130.

For ease and clarity of description, updated disconnect/connect information is depicted in FIG. 1 as being received in two separate files: a file of service disconnect updates 110 and a file of service connection updates 120. As shown in the example, the file of recent service disconnect updates 110 includes records for individual disconnect requests that comprise a name, address, telephone number, and effective date for a request to disconnect service, such as telephone service, at the address. Similarly, a file of service connect updates 120 includes records for recent service connection requests that comprise a name, address, telephone number, and effective date for a request to connect service at the new address. In other embodiments, the updated disconnect/connect information may be received in another format other than as records. For example, the information may be received in a comma-delimited text file or other computer-readable format.

The service-based COA system 130 receives as input the service disconnect updates file 110 and the service connection updates file 120 and identifies records from the two files 110, 120, typically a pair of records, including a disconnect record and a connect record, that potentially indicate a change of address for one or more service customers associated with the records.

A confidence assessment module 140 assesses the likelihood that two records identified as being a potential match actually indicate a change of address for an individual or a household. In various embodiments, the confidence assessment module 140 may be implemented in a wide variety of suitable forms, including, but not limited to: a rule-based system, decision tree, neural network, expert system, genetic system, Bayesian or other probabilistic network, a scoring matrix based on a system of linear equations or other calculation or decision-making system. The confidence assessment module 140 will be described in greater detail with reference to FIGS. 3 and 4 below.

As depicted in FIG. 1, the confidence assessment module 140 may be included in the service-based COA system 130. In other embodiments, the confidence assessment module 140 may be implemented as a stand-alone module that communicates with the service-based COA system 130 in order to provide an assessment of the likelihood that two identified records correctly indicate a change of address.

Data indicative of changes of address or other contact information for individuals and/or other entities that has been assessed as being accurate may be stored in a repository of service-based change of address files 150 for use in a variety of manners. For example, an internal database of consumer information may be updated using the change of contact information data. As another example, the change of contact information data may be transmitted to creditors and other entities interested in being quickly notified of changes of address who may use the data to update their own databases or for other uses.

FIG. 2 provides an example portion of one embodiment of a merged disconnect/connect file 200. For ease and clarity of description, the service disconnect update file 110 and the service connection update file 120 from FIG. 1 are depicted in FIG. 2 as including information about telephone service disconnect and connect requests and as having been merged into a single file 200. Each record of the file 200 includes a number of fields, including a TYPE field that indicates whether the record refers to a telephone service connection request (indicated in this example by the notation: ADD) or to a telephone service disconnection request (indicated in this example by the notation: DEL). In addition to the record type information, each record includes information about a name, address, telephone number, and effective date associated with each telephone service connect/disconnect request. For ease of description, the records in the sample disconnect/connect file 200 of FIG. 2 are assumed to refer to connect and disconnect requests from the state of Michigan, with the exception of one record that refers to a connect request for the state of California.

In other embodiments where telephone service information is used, the records of the file 200 of telephone disconnect/connect requests may include different information. For example, the records of the file 200 may include information about a forwarding address, for purposes of sending a final bill, provided by an individual together with a service disconnect request. In some embodiments, the file 200 does not include telephone number information. The records of the file 200 may include information about the names of other known household members. The records of the file 200 may include information specifically linking a telephone service disconnect request with a telephone service connect request, when the two requests are made during a single phone call to a telephone company. Similarly, the records of the file 200 may include other information provided by a telephone company or other electronic directory assistance service provider associated with telephone disconnect/connect requests, to the extent that such information disclosure is permitted by law.

As can be seen in the sample file portion depicted in FIG. 2, not every DEL record is easily associated with an ADD record. Conversely, not every ADD record is easily associated with a DEL record. As can be further seen, while some records provide a full first name for an individual associated with the telephone service request, other records may provide only a first initial for the individual. Similarly, while some records provide a street address, other records do not.

The service-based COA system 130 uses information that is provided in the records of the file 200 to match records, typically pairs of records, that may refer to a single change of address for an individual and/or a household. For some identified matches, the associated records provide an abundance of information indicative that the match is an accurate one. For some identified matches, the associated records provide some information indicative that the match might be accurate, but not sufficient information to provide a high level of confidence in the accuracy of the match.

In various embodiments, the confidence assessment module 140 of the service-based COA system 130 performs an analysis of the records and provides an indication of a level of confidence in the accuracy of the match. In some embodiments, the indication is provided in the form of a score that expresses a level of confidence from within a range of possible levels of confidence. In some embodiments, the indication is provided in the form of a categorization, such as a grade, that expresses a level of confidence in the accuracy of the match. In some embodiments, the confidence assessment module 140 divides the identified matches into a set of matches that meet or exceed an acceptable minimum level of confidence and a set of matches associated with a confidence level that is lower than the acceptable minimum level of confidence. In such embodiments, both sets may be stored in the repository 150 or otherwise used separately, or only the set of matches that meet or exceed the acceptable minimum level of confidence is stored in the repository 150 or otherwise retained for subsequent use.

In other embodiments, records of disconnect and connect requests for services other than telephone service may be used. In some embodiments, service records from more than one type of service may be used. In some embodiments that use records from more than one type of service, pairs of disconnect and connect records for the same types of service may be compared first, after which, results of the comparisons from the different service types may be combined and compared to provide an assessment of likelihood that the records match. In other embodiments that use records from more than one type of service, various disconnect and connect records for various types of services may be compared together.

The connect and disconnect information shown in FIG. 2 may be implemented using one or more of a wide variety of types of computer storage devices, and using one or more of a wide variety of types of data repositories, including, but not limited to, relational databases, flat files, caches, and the like.

Figure 3:
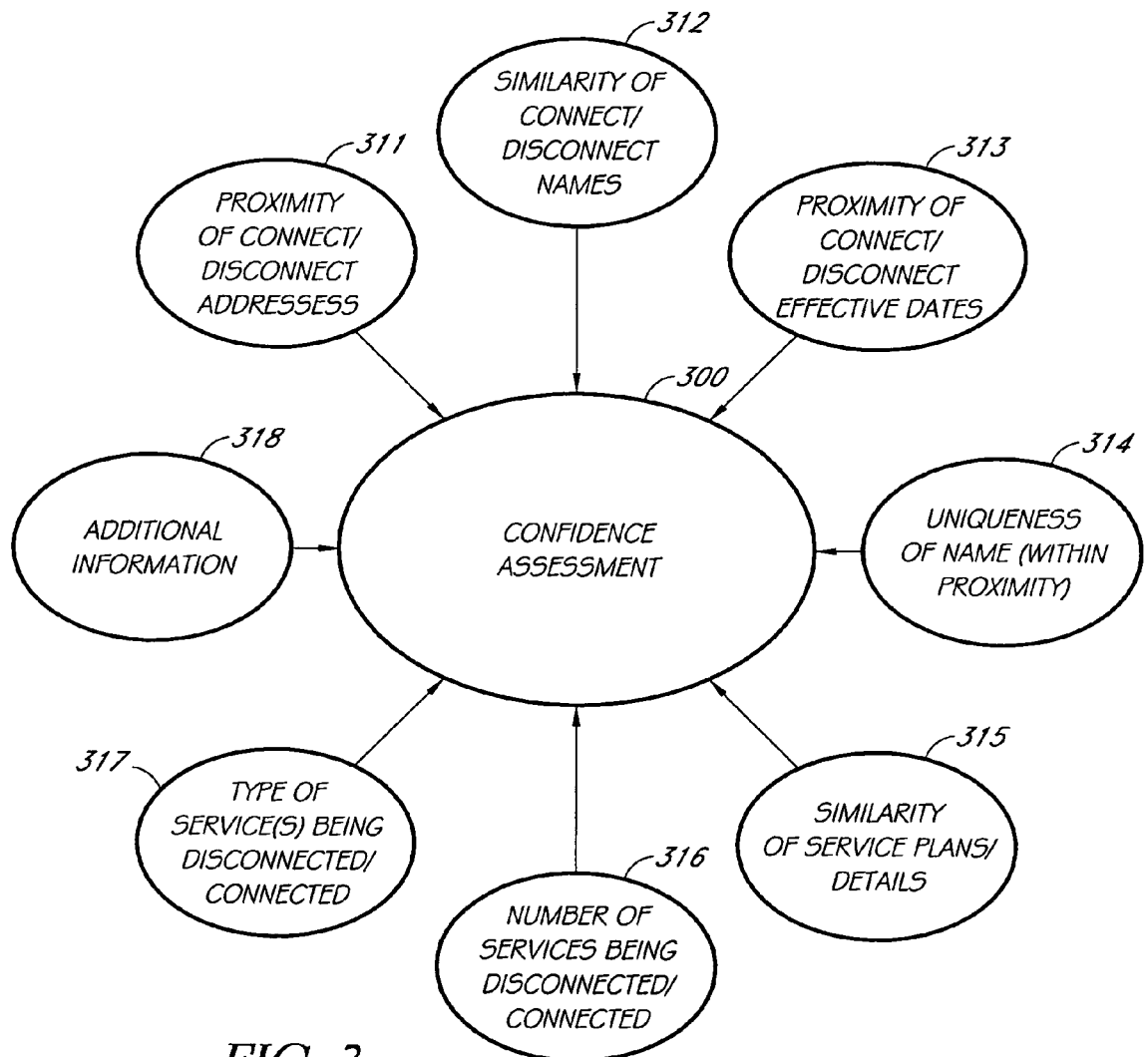
FIG. 3 is a diagram that depicts one embodiment of a set of factors associated with assessing confidence in matching connect and disconnect information.

FIG. 3 is a diagram that depicts one embodiment of a set of factors 311-318 associated with a confidence assessment 300 performed by the confidence assessment module 140 for potentially matching pairs of connect and disconnect records. As will be appreciated by practitioners experienced in the design of confidence assessments, factors that influence an assessment, and an exact method for combining the influences to produce a confidence assessment, may take a variety of forms without departing from the spirit of the service-based COA system 130 described herein. In some embodiments, for example, the various factors 311-318 represent numerical points that may be added to or subtracted from a numerical confidence assessment score calculated for the match. In some embodiment, the various factors may be weighted to that a selected one or more of the factors influences the assessment more than does another factor. In other embodiments, other methods of combining factors to produce a confidence assessment 300 may be used.

As depicted in FIG. 3, one of the factors that influence the confidence assessment 300 is the geographical proximity of the addresses 311 provided in association with the connect record and the disconnect record of a potentially matching pair of records. The proximity of connect/disconnect addresses 311 may be assessed using one or more methods. For example, a determination of linear distance between the two provided addresses, expressed for example, in miles or kilometers, may be used. Additionally or alternatively, information about whether the two addresses are within the same state may be used, particularly because it is known that a large proportion of household moves are intrastate moves of relatively small distances. Some sources indicate that 85% of household moves are within 20 miles. Thus, finding two potentially matching records with addresses in the same state may contribute to a higher confidence level that the two records relate to the same individual or household. In some embodiments, higher confidence of matching may be assessed for records that include cities, states and/or zip codes that are geographically adjacent or in close proximity to one another.

A second factor that influences the confidence assessment 300 depicted in FIG. 3 is the similarity of the names 312 provided in association with the connect record and the disconnect record of a potentially matching pair of records. The similarity of the connect and disconnect names 312 may be assessed in a variety of ways. For example, the first and last names in the connect record and the disconnect record may be compared to determine if they are an exact match. Additionally or alternatively, the names may be compared using an algorithm that makes allowances for frequently occurring types of misspellings and typographical errors. Thus, names that match except for a pair of transposed letters, or that are spelled differently but are phonetically the same, may be assessed as being more similar than are two names that are completely disparate. One embodiment of the service-based change of address system 130 makes use of an algorithm that takes a word, such as a person's name, as input and produces a character string which identifies a set of words that are, at least roughly, phonetically alike.

The confidence assessment 300 may be performed considering the first and last names as a unit. Alternatively, the confidence assessment 300 may be performed considering the first and last names separately. The confidence assessment 300 may also be performed giving greater weight to similarity in the last name than in the first name.

Many telephone records include only a first initial instead of a full first name. To take such occurrences into account, for telephone service records, the confidence assessment 300 may be configured to allow a match to be recognized only if both records have the same initial. In other embodiments, the confidence assessment 300 may recognize a match between a first name in a first record and the first initial of the name in a second record.

A third factor that influences the confidence assessment 300 depicted in FIG. 3 is the proximity of the effective dates 313 provided in association with the connect record and the disconnect record of a potentially matching pair of records. When a small amount of time has lapsed between a service disconnect request and a service connection request, the confidence assessment module 140 assesses a greater likelihood that the two requests may be connected. In some embodiments, effective dates that fall within thirty days of one another are deemed to be indicative of a greater likelihood of matching. In other embodiments, proximity of effective dates 313 is assessed on a more granular level. For example, effective dates from two records that fall within three days of one another are assessed as being more predictive of a match than are effective dates two weeks apart, which, in turn, are deemed to be more predictive of a match than are effective dates that fall six weeks apart.

In some embodiments, the uniqueness of a customer name 314 may influence a score or other assessment of a likelihood that potentially matching records do, in fact, represent a change of address by an individual or a household. For example, if two records include the same uncommon name, and one or more other the factors 311-13, 315-318 indicate that the two records may not be a match, the fact that the matching names are uncommon may indicate an increased likelihood that the records are, in fact, a match. Similarly, if two names are similar, but not exactly the same, and if the two names are quite different from other names in the files 110, 120, the likelihood that they do match may be assessed at a higher level than if the two similar-but-not-exact names are also similar to many other names in the files 110, 120.

In some embodiments, the confidence assessment module 140 may be programmed to identify names that are relatively uncommon within a given geographical proximity, even if they may not be uncommon in all proximities, and to use this information in the assessment. Similarly, information about names that are especially common within a given proximity, even if they may not be common in all proximities, may be used in the assessment.

Another factor that may, in some embodiments, be used by the confidence assessment module 140 is a level of similarity between service details associated with the disconnect request's service account and service details associated with the connect request's service account. For example, if telephone service at the disconnect account included a call-waiting feature and a voice mail feature, and if telephone service at the connect account includes the same set of features, there may be an increased likelihood that the two requests are indicative of a household's change of address. As another example, a similar analysis of channel selection for cable television service in association with the disconnect account and in association with the connect account may be performed and used by the confidence assessment module 140.

Furthermore, while an individual's telephone number typically changes when service is disconnected in one location and connected in another, instances may occur in which a given telephone number is associated with both a connect and a disconnect notice. Such an occurrence, especially in combination with other predictive factors, may be a good indication that a high level of confidence in the match is warranted.

In some embodiments, information about a number of services being disconnected and/or connected 316 may influence a score or other assessment of likelihood that potentially matching records do, in fact, represent a change of address by an individual or a household. For example, if the service-based change of address system 130 has access to disconnect and connect records for multiple types of utilities and other services, and if the confidence assessment module 140 identifies potentially matching records for telephone service, for electricity service, and for gas service, all of which indicate the same change of address from a first address to a second address, then the likelihood of the change of address match being accurate may be assessed at a higher level. Furthermore, if in the above situation, information is also available about disconnect requests for cable service and home water delivery at the first address, even without corresponding connect request information for the second address, the information may be assessed by the confidence assessment module 140 as supporting the likelihood of a move from the first address.

At the same time, if the service-based change of address system 130 has access to disconnect and connect records for multiple types of utilities and other services, and if the confidence assessment module 140 finds only one indication of a matching pair of disconnect and connect requests, then the confidence assessment module 140 may assess the likelihood of the match being accurate as being reduced. In other embodiments, other methods for using information about the number of services being disconnected and/or connected 316 in a change of address confidence assessment 400 may also be used by the service-based change of address system 130.

In some embodiments, information about one or more types of services being disconnected/connected 317 may influence a score or other assessment of likelihood of a correct change of address match. Disconnection and/or connection of services that are deemed to be more essential, such as water, electricity, and gas service, for example, may, in some embodiments, be assessed as being more indicative of a change of address than are disconnection and/or connection of services that are deemed to be less essential, such as satellite television service, or newspaper delivery.

Furthermore, some types of services, such as basic utilities, are often provided by only a single provider at a given location, while other types of services, such as newspaper or water delivery, may be offered by several different providers for the same locations. In some embodiments of the service-based change of address system 130, disconnection/connection of services provided by only a single provider at the service location may be assessed as being more indicative of a change of address than is disconnection/connection of services provided by more than one provider at the service location. In other embodiments, other methods for using information about one or more types of services being disconnected/connected 317 in a change of address confidence assessment 400 may also be used by the service-based change of address system 130.

Other factors 318 may additionally or alternatively influence the confidence assessment 300. For example, service companies, or other vendors that process customer service calls on their behalf, may assign an identifier, such as a call identification number, to customer service communications received, and may include the call identification number in the records for any service connect or disconnect request made during the call. Since service disconnection and connection requests associated with a short-distance move are frequently submitted by service customers during a single telephone call or a single web session with a service company website, for example, the call identification number may provide an indication of a disconnect request and a connect request that were submitted during a single call, web session, or written request. Connect and disconnect requests may then be matched by the service-based COA system 130 with a higher level of confidence.

Furthermore, in some embodiments, additional information 318 may be available from other sources that may be used by the service-based change of address system 130 to help it perform a confidence assessment for matching service disconnect and connect requests. As another example, a database of general and consumer information about a population may include information useful to a confidence assessment 300 for a service-based change of address system 130, to the extent that privacy laws permit the use of such information. For example, the database may include names of other members of an individual's household. If a disconnect request and a connect request are made in the names of two individuals known to be members of a single household, confidence in the match of the two requests may be assessed as being higher than if the fact of the two individuals' sharing a household was not known. As another example, if an individual has informed one creditor or financial institution about a change of address that is subsequently reported to and stored in the database, then that change of address information may be used together with the other factors that influence the confidence assessment 300 by the service-based COA system 130.

The set of factors 311-318 that influence the embodiment of the confidence assessment 300 depicted in FIG. 3 is presented here as an example and is not intended to limit the scope of the service-based change of address system. Thus, embodiments are contemplated in which a subset of the factors depicted 311-318 are used by a service-based change of address system 130, either alone or in combination with other factors. Furthermore, various factors influence the confidence assessment 300 may be weighted more or less in various embodiments.

FIG. 4 is a table 400 outlining one embodiment of a scoring system for assessing confidence in a correct match between a telephone service connect record and a telephone service disconnect record. The scoring system depicted in FIG. 4 uses similarity of connect/disconnect names 312, as well as sameness of telephone numbers between a disconnect record and a connect record to assign a base score, as is outlined in a top portion 410 of the table 400. The scoring system depicted in FIG. 4 also uses additional factors to supplement the base score, as outlined in a first bottom portion 420 of the table 400, in which proximity of connect/disconnect addresses 311 (intrastate vs. interstate) and proximity of connect/disconnect effective dates 313 are used to refine calculation of the confidence score by adding supplemental points based on various characteristics of the connect and disconnect records being matched. Furthermore, for embodiments of the service-based change of address system 130 in which records of disconnect and connect requests for multiple services are used, supplemental points are added when more than one type of service disconnect/connect match is identified, as indicated in a second bottom portion 430 of the table 400.

Looking back at the sample merged file 200 of telephone connect and disconnect records in FIG. 2, we can see that, according to the scoring system of FIG. 4, the following table of sample matches produces the associated confidence scores. In this example, because all of the records in the sample merged file 200 of FIG. 2 are for telephone disconnect and connect requests, none of the candidate matching records receives supplemental points for having more than one type of service disconnect/connect match identified.

| RECORDS | BASE SCORE | SUPPLEMENT | TOTAL SCORE |
|---|---|---|---|
| 1 and 2 | 200 | +80 | 280 |
| 3 and 4 | 0 | +10 | 10 |
| 5 and 6 | 300 | +70 | 370 |
| 9 and 10 | 200 | +50 | 250 |
| 9 and 12 | 100 | +70 | 170 |
| 9 and 13 | 100 | +80 | 180 |
| 11 and 10 | 100 | +50 | 150 |
| 11 and 12 | 200 | +80 | 280 |
| 11 and 13 | 600 | +70 | 670 |

In other embodiments, other forms of assessment and/or scoring may be implemented to indicate a level of confidence in a potential change of address based on service connect and disconnect information.

Once the service disconnect update file 110 and the service connect update file 120 have been processed by the service-based change of address system 130, the resulting matches of connect and disconnect records, with or without confidence scores may be used and/or stored in a variety of forms. In one embodiment, a list of updated address information is posted on a web page accessible via the World Wide Web or other Internet access mechanism. In one embodiment, entities interested in receiving updated address information may request that such information be transmitted to them electronically. In one embodiment, the service-based change of address system 130 is implemented by a locator service that maintains up-to-date records for locating individuals. Updated change of address information may then be used internally to update the records for locating individuals. Parties who wish to request up-to-date address information about an individual may request such information from the locator service, which consults its records to provide most current location information for the individual.

In some embodiments, the change of address information is provided together with a confidence score or confidence category, thus allowing a user of the information to determine whether the confidence level is high enough to make the information useful for the user's purposes. In some embodiments, only matches above a threshold level of confidence are provided.

Figure 5:
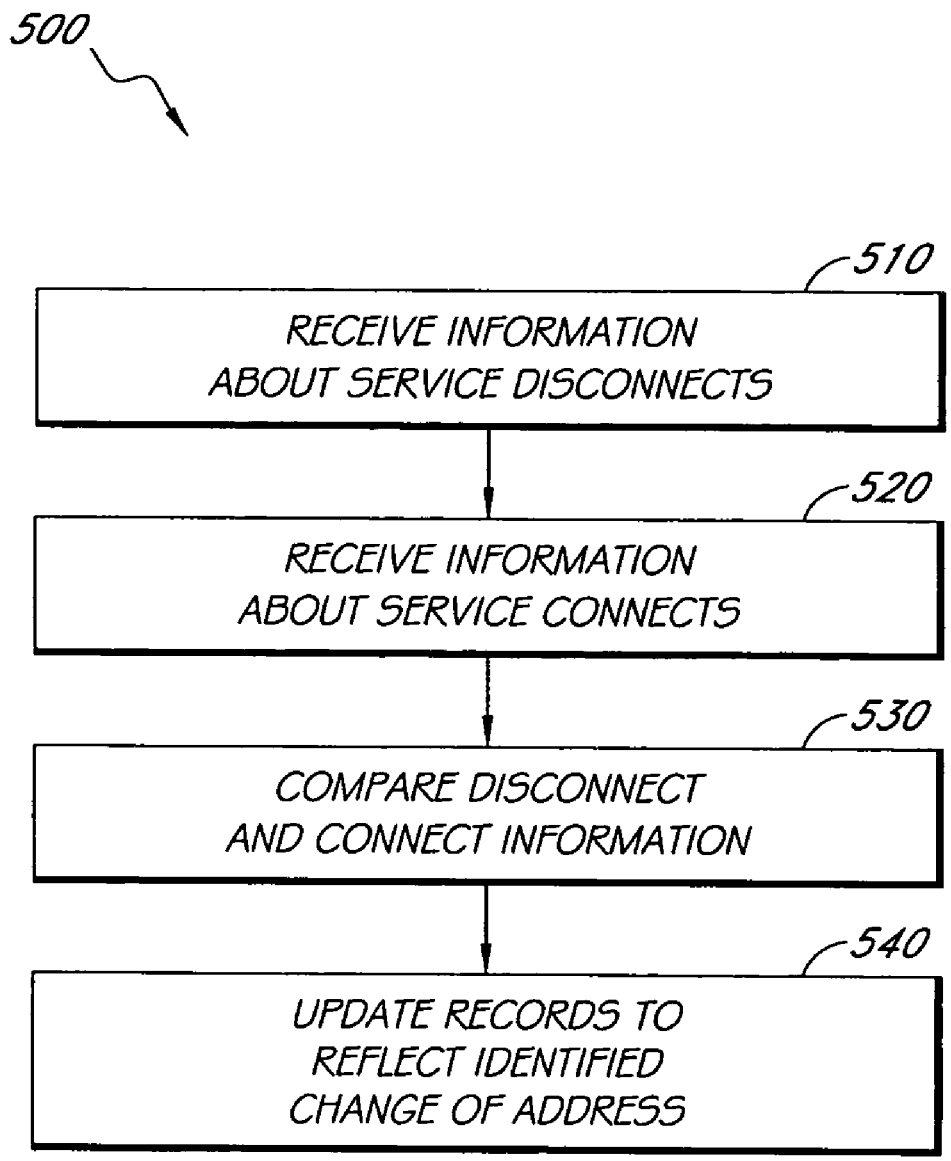
FIG. 5 is a flowchart that depicts one embodiment of a process for updating change of address records.

FIG. 5 is a flowchart that depicts one embodiment of a process 500 for updating change of address records. The process 500 begins in block 510, where the service-based change of address system 130 receives information about service disconnect requests, as has been described above with reference to FIGS. 1 and 2, among other parts of the current disclosure. In block 520, the service-based change of address system 130 receives information about service connect requests, as has also been described above with reference to FIGS. 1 and 2, among other parts of the current disclosure. In block 530 the confidence assessment module 140 of the service-based change of address system 130 compares the information received about the service disconnect and connect requests to identify potentially matching disconnect and connect requests and to assess confidence in the accuracy of the identified matches, as has been described with reference to FIGS. 3 and 4 above, among other parts of the current disclosure. In block 540, the service-based change of address system 130 uses results of the comparison and assessment performed in block 530 to store or update change of address records. In various other embodiments, the results of the assessment may be transmitted to one or more parties who use the results to update contact information in their own databases, or for other purposes.

Figure 6:
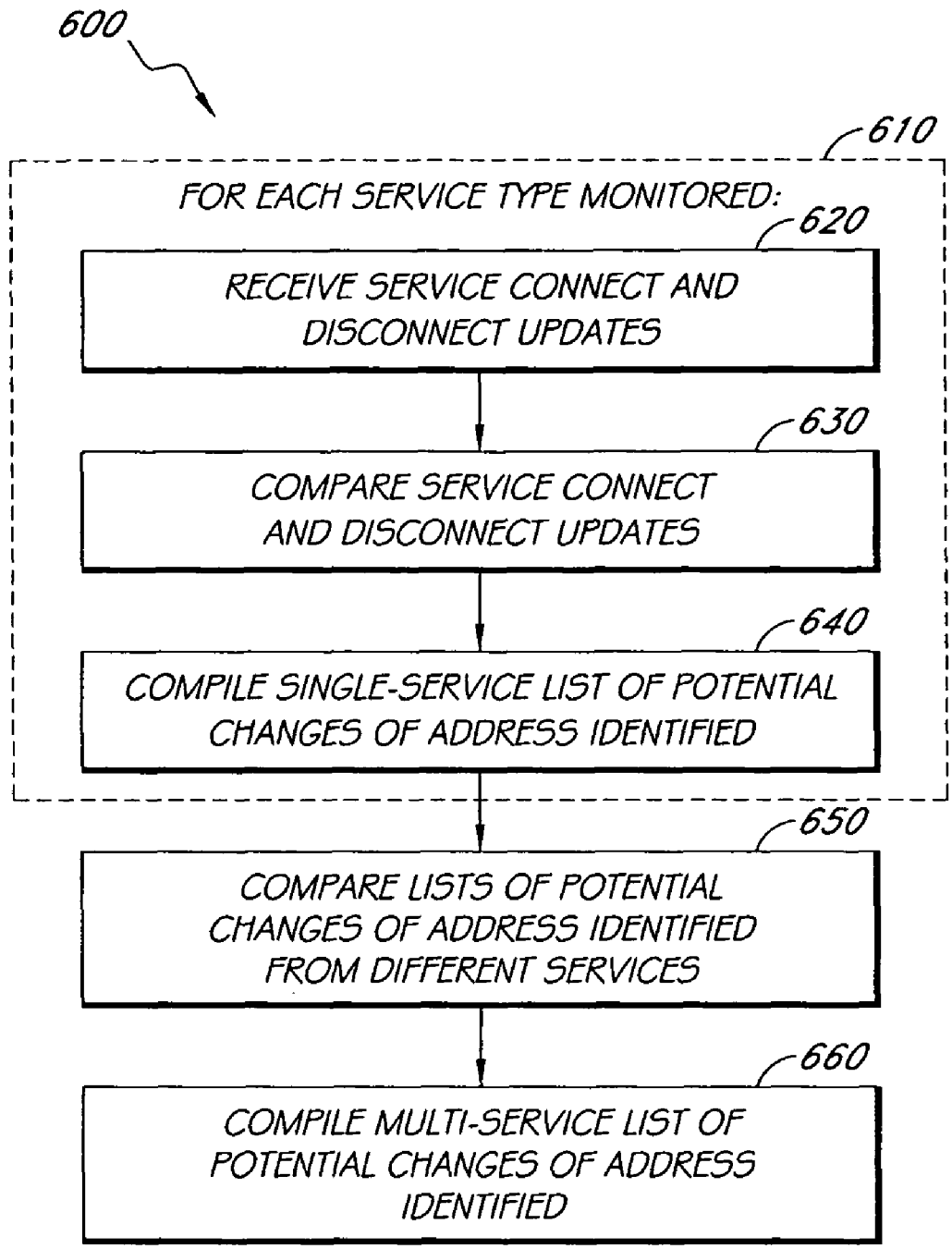
FIG. 6 is a flowchart that depicts one embodiment of a process for updating change of address records using information about disconnect and connect requests for one or more types of services.

FIG. 6 is a flowchart that depicts one embodiment of a process 600 for updating change of address records using information about disconnect and connect requests for one or more types of services. In embodiments of the service-based change of address system 130 in which information is received about disconnect and connect requests for multiple types of services, the process 600 may first perform an assessment 610 for each service type for which data is available, and then use the results of the assessment 610 in the remainder 650, 660 of the process 600.

Describing the assessment 610 performed for each service type, the assessment process 610 begins in block 620, where the service-based change of address system 130 receives information about service disconnect and connect requests for a single type of service, as has been described above with reference to FIGS. 1 and 2, among other parts of the current disclosure. In block 630 the confidence assessment module 140 of the service-based change of address system 130 compares the information received about the service disconnect and connect requests for the single type of service to identify potentially matching disconnect and connect requests and to assess confidence in the accuracy of the identified matches, as has been described with reference to FIGS. 3 and 4 above, among other parts of the current disclosure. In block 640, the service-based change of address system 130 uses results of the comparison and assessment performed in blocks 630 to compile a single-service list of potential changes of address that have been identified by the confidence assessment module 140.

The assessment process 610 is performed separately for each service type to be included in the change of address identification and assessment process 600.

Once all of the single-service list of potential changes of address have been compiled, the process 600 continues with block 650, where the confidence assessment module compares the compiled lists of potential changes of address identified from assessment performed in sub-process 610. Additional analysis of the data is performed by combining information identified from the disconnect and connect records from different services to assess a final level of confidence in the accuracy of potential matches identified.

In block 660, a multi-service list of potential changes of address that have been identified by the process 600 is stored for subsequent use and retrieval.

The blocks of the embodiments of the processes 500, 600 for performing a service-based change of address assessment, as depicted in FIGS. 5 and 6, may, in various other embodiments, be modified and/or re-arranged in a variety of ways, without departing from the spirit of the invention. Furthermore, a practitioner of skill in the art, after reading the disclosure herein, will be able to recognize that a wide variety of other assessment methods and combinations of assessment methods may advantageously used to provide the service-based change of address system described herein.

For example, regarding to the embodiment of the process 600 described with reference to FIG. 6, in which the single-service assessments 610 are performed separately for each service type before combining the information from the different service types, in other embodiments of the process 600, the information regarding the various service connect and disconnect requests may be combined and assessed together in a multi-service assessment from the beginning of the process. In still other embodiments, other assessment methods may be used to provide the service-based change of address system described herein. Furthermore, in some embodiments, a plurality of entities that collect and maintain change of address or other change of contact information data, or service disconnect and/or connect data, may cooperatively share such data.

Although the foregoing systems and methods have been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. While certain embodiments of the inventions have been described, these embodiments have been presented by way of example only, and are not intended to limit the scope of the inventions. Indeed, the novel methods and systems described herein may be embodied in a variety of other forms without departing from the spirit thereof. The accompanying claims and their equivalents are intended to cover such forms or modifications as would fall within the scope and spirit of the invention.

What is claimed is:

1. A method, for performance by a computer system, of identifying a potential new address for at least one customer of a service-provider, the method comprising:
   receiving, by a computer system that comprises one or more processors, data about a first set of consumers comprising individual customers of at least one service-provider, said customers having submitted a service disconnect request to the at least one service-provider, requesting that their service be disconnected, wherein the data about the first set of consumers comprises, for each individual customer, at least a customer name, a service disconnect date, and a service disconnect address at which the service is to be disconnected;
   receiving, by the computer system, data about a second set of consumers comprising individual customers of at least one service-provider, said customers having submitted a service connect request to the at least one service-provider requesting that service be connected, wherein the data about the second set of consumers comprises, for each individual customer, at least a customer name, a service connect date, and a service connect address at which the service is to be connected;
   programmatically comparing, by the computer system, the data about the individual customers in the first set of consumers and the data about the individual customers in the second set of consumers;
   identifying, by the computer system, at least one individual customer in the first set of consumers who is also possibly a member of the second set of consumers;
   assessing a level of confidence that the identified at least one individual customer in the first set of consumers is in fact the same customer in the second set of consumers, said confidence assessment comprising calculating a likelihood that the compared data reflects a change of address for the identified at least one individual customer, said likelihood being based, at least in part, on at least two of a set of factors, the set comprising: geographical proximity of a service connect address and a service disconnect address, similarity of names associated with a service connect request and a service disconnect request, proximity of a service connect date and a service disconnect date, uniqueness of a name associated with a service connect request and a service disconnect request, and similarity of service plan details associated with a service connect request and service plan details associated with a service disconnect request; and
   if the assessed level of confidence is above a threshold amount, storing, in computer readable storage, an indication of the service connect address for the identified at least one customer.

2. The method of claim 1, wherein each of the consumers in the first set and each of the consumers in the second set is at least one of the set comprising: a person, a household, a business, and an organization.

3. The method of claim 1, wherein the set of factors for calculating the likelihood that the compared data reflects a change of address for the identified at least one customer further comprises: similarity of service payment information, sameness of telephone number associated with a service disconnect request and a service connect request, sameness of a geographical state associated with a service disconnect request and a service connect request, and uniqueness of a name that is associated with a service disconnect request and a service connect request, wherein the uniqueness of the name is determined with respect to a geographical proximity associated with the service disconnect request and the service connect request.

4. The method of claim 1, wherein assessing a level of confidence that the identified at least one individual customer in the first set of consumers is in fact the same customer in the second set of consumers further comprises calculating, based on an analysis algorithm, a likelihood that the compared information reflects a change of address for the identified at least one customer.

5. The method of claim 1, wherein the service disconnect requests comprise telephone service disconnect requests, and wherein the service connect requests comprise telephone service connect requests.

6. The method of claim 1, wherein the service disconnect requests and the service connect requests regarding at least one of the set comprising: electricity service, water service, gas service, cable service, satellite televisions service, direct television service, fuel delivery service, newspaper delivery service, water delivery service, garbage pick-up service, gardening service, and pool maintenance service.

7. The method of claim 1, wherein the data about the first set of consumers comprise data about service disconnect requests submitted to a plurality of types of service providers; and
   wherein the data about the second set of consumers comprise data about service connect requests submitted to a plurality of types of service providers.

8. The method of claim 7, wherein the set of factors for calculating the likelihood that the compared information reflects a change of address for the identified at least one individual customer further comprises: a number of services for which service connect requests and service disconnect requests are available, and information about one or more types of services for which service connect information and service disconnect request information are available.

9. The method of claim 1, wherein the at least one service-provider to which the first set of consumers submitted a service disconnect request and the at least one service-provider to which the second set of consumers submitted a service connect request are the same.

10. The method of claim 1, wherein the at least one service-provider to which the first set of consumers submitted a service disconnect request and the at least one service-provider to which the second set of consumers submitted a service connect request are different.

11. The method of claim 1, wherein one or more types of service provided by the at least one service-provider to which the first set of consumers submitted a service disconnect request and one or more types of service provided by the at least one service-provider to which the second set of consumers submitted a service connect request are the same.

12. The method of claim 1, wherein one or more types of service provided by the at least one service-provider to which the first set of consumers submitted a service disconnect request and one or more types of service provided by the at least one service-provider to which the second set of consumers submitted a service connect request are different.

13. A computer-based system for using information about service connect orders and service disconnect orders to identify potential new contact information for at least one customer of a service-provider, the system comprising:

electronically readable data comprising information about a first set of consumers that comprises individual customers who have submitted service disconnect orders, each service disconnect order requesting that a service or utility at a service disconnect address associated with contact information for a customer having a customer name be discontinued on a given service disconnect date;

electronically readable data comprising information about a second set of consumers that comprises individual customers who have submitted service connect orders, each service connect order requesting that a service or utility at a service connect address associated with contact information for a customer having a customer name be connected on a given service connect date; and a computer system comprising one or more processors configured to:

compare the electronically readable data about the first set of consumers with the electronically readable data comprising information about the second set of consumers;

identify at least one individual customer in the first set of consumers who is also possibly a member of the second set of consumers;

assess a level of confidence that the identified at least one individual customer in the first set of consumers is in fact the same customer in the second set of consumers, said confidence assessment comprising calculating a likelihood that the compared data reflects a change of address for the identified at least one individual customer, said likelihood being based, at least in part, on at least two of a set of factors comprising: geographical proximity of a service connect address and a service disconnect address, similarity of names associated with a service connect request and a service disconnect request, proximity of a service connect date and a service disconnect date, uniqueness of a name associated with a service connect request and a service disconnect request, and similarity of service plan details associated with a service connect request and service plan details associated with a service disconnect request; and if the assessed level of confidence is above a threshold amount, store, in computer readable storage, a record of the contact information from the service connect order as a potential change of contact information for the identified at least one customer.

14. The computer-based system of claim 13, wherein each of the consumers in the first set and each of the consumers in the second set is at least one of the set comprising: a person, a household, a business, and an organization.

15. The computer-based system of claim 13, wherein the change of contact information is at least one of: a change of residential address, a change of telephone number, and a change of mailing address.

16. The computer-based system of claim 13, further comprising a data repository for storing information about the change of contact information.

17. The computer-based system of claim 13, wherein the electronically readable data comprises information associated with telephone service connect and disconnect orders.

18. The computer-based system of claim 13, wherein the electronically readable data comprises information associated with service connect and disconnect orders for at least one of the set comprising: electricity service, water service, gas service, cable service, satellite televisions service, direct television service, fuel delivery service, newspaper delivery service, water delivery service, garbage pick-up service, gardening service, and pool maintenance service.

* * * * *